(12) United States Patent
Rickabaugh

(10) Patent No.: US 9,015,574 B2
(45) Date of Patent: Apr. 21, 2015

(54) APPARATUS, SYSTEM AND METHOD FOR A VECTOR-BASED FORM FIELD DOCUMENT

(76) Inventor: Jason Porter Rickabaugh, Eagle Mountain, UT (US)

( * ) Notice: Subject to any disclaimer, the term of this patent is extended or adjusted under 35 U.S.C. 154(b) by 109 days.

(21) Appl. No.: 13/417,061

(22) Filed: Mar. 9, 2012

(65) Prior Publication Data

US 2012/0233532 A1    Sep. 13, 2012

Related U.S. Application Data

(60) Provisional application No. 61/451,509, filed on Mar. 10, 2011.

(51) Int. Cl.
*G06F 17/22* (2006.01)
*G06F 3/048* (2013.01)
*G06F 17/24* (2006.01)

(52) U.S. Cl.
CPC .......... *G06F 17/243* (2013.01); *G06F 17/2247* (2013.01)

(58) Field of Classification Search
USPC ......... 715/200, 201, 204, 205, 209, 210, 224, 715/225, 226, 234, 239, 249, 255, 256, 273, 715/700, 760, 762, 780, 786
See application file for complete search history.

(56) References Cited

U.S. PATENT DOCUMENTS

| | | | |
|---|---|---|---|
| 5,339,393 A | 8/1994 | Duffy et al. | |
| 5,704,029 A | 12/1997 | Wright, Jr. | |
| 5,818,955 A | 10/1998 | Smithies et al. | |
| 6,272,506 B1 | 8/2001 | Bell | |
| 6,360,236 B1 | 3/2002 | Khan et al. | |
| 6,490,601 B1 * | 12/2002 | Markus et al. | 715/207 |
| 6,895,552 B1 | 5/2005 | Balabanovic et al. | |
| 6,959,414 B1 | 10/2005 | Kakehashi | |
| 7,055,092 B2 | 5/2006 | Yardumian et al. | |
| 7,134,092 B2 | 11/2006 | Fung et al. | |
| 7,307,642 B2 | 12/2007 | Sack et al. | |
| 7,430,711 B2 | 9/2008 | Rivers-Moore et al. | |
| 7,502,934 B2 | 3/2009 | Dietl | |
| 7,509,353 B2 | 3/2009 | Kelkar et al. | |
| 7,539,869 B1 | 5/2009 | Mullan et al. | |
| 7,694,145 B1 | 4/2010 | Pravetz et al. | |

(Continued)

FOREIGN PATENT DOCUMENTS

| | | |
|---|---|---|
| CA | 2697948 A1 | 3/2009 |
| EP | 0394168 A2 | 10/1990 |

(Continued)

OTHER PUBLICATIONS

PCT/US2012/028629, International Search Report and Written Opinion, Mailed Oct. 19, 2012.

(Continued)

*Primary Examiner* — Maikhanh Nguyen
(74) *Attorney, Agent, or Firm* — Kunzler Law Group

(57) ABSTRACT

An apparatus for a vector-based form field document includes a reference module referencing document content for a vector-based document and referencing form field information corresponding to the document content. A loading module loads the document content in a vector-based document viewer. An insertion module inserts one or more form fields onto the document content in the viewer. The one or more form fields are inserted based on the form field information. Each form field includes a field for user input.

20 Claims, 6 Drawing Sheets

(56) References Cited

U.S. PATENT DOCUMENTS

| | | |
|---|---|---|
| 7,779,355 B1 | 8/2010 | Erol et al. |
| 8,484,551 B2 * | 7/2013 | Petersen ............ 715/221 |
| 2001/0034835 A1 | 10/2001 | Smith |
| 2001/0050681 A1 | 12/2001 | Keys et al. |
| 2002/0040431 A1 | 4/2002 | Kato et al. |
| 2002/0069179 A1 | 6/2002 | Slater et al. |
| 2002/0178190 A1 | 11/2002 | Pope et al. |
| 2003/0182402 A1 * | 9/2003 | Goodman et al. ............ 709/220 |
| 2004/0049740 A1 | 3/2004 | Petersen |
| 2004/0181525 A1 | 9/2004 | Itzhak et al. |
| 2005/0086248 A1 | 4/2005 | Atchison |
| 2005/0128508 A1 | 6/2005 | Greeff et al. |
| 2005/0193330 A1 | 9/2005 | Peters |
| 2006/0031757 A9 | 2/2006 | Vincent, III |
| 2006/0259440 A1 | 11/2006 | Leake et al. |
| 2006/0271837 A1 | 11/2006 | Friedman et al. |
| 2006/0282442 A1 | 12/2006 | Lennon et al. |
| 2006/0286534 A1 | 12/2006 | Tillis et al. |
| 2007/0028172 A1 | 2/2007 | Greer et al. |
| 2007/0083851 A1 | 4/2007 | Huang et al. |
| 2007/0112926 A1 | 5/2007 | Brett et al. |
| 2007/0146812 A1 | 6/2007 | Lawton |
| 2007/0206022 A1 * | 9/2007 | Skaggs .................... 345/581 |
| 2007/0294725 A1 | 12/2007 | Cohen et al. |
| 2008/0147790 A1 | 6/2008 | Malaney et al. |
| 2008/0209311 A1 | 8/2008 | Agronik et al. |
| 2008/0235585 A1 | 9/2008 | Hart et al. |
| 2009/0055413 A1 | 2/2009 | Audet |
| 2009/0077658 A1 | 3/2009 | King et al. |
| 2009/0119179 A1 | 5/2009 | Kolve et al. |
| 2010/0070843 A1 | 3/2010 | Duym |
| 2010/0083129 A1 | 4/2010 | Mishra et al. |
| 2010/0172594 A1 | 7/2010 | Priddle et al. |
| 2010/0271397 A1 * | 10/2010 | Feldstein et al. ............ 345/646 |
| 2010/0293384 A1 | 11/2010 | Potkonjak |
| 2011/0035660 A1 | 2/2011 | Lussier et al. |
| 2012/0089659 A1 * | 4/2012 | Halevi et al. ................. 709/201 |

FOREIGN PATENT DOCUMENTS

| | | |
|---|---|---|
| KR | 20090014492 A | 2/2009 |
| WO | 2007030488 A1 | 3/2007 |
| WO | 2009026727 A2 | 3/2009 |
| WO | 2009034718 A1 | 3/2009 |

OTHER PUBLICATIONS

Joe Magas, "Pdf—Raster or Vector?", The Less Paper Blog, URL: http://www.thelesspaperblog.com/2009/10/pdf-raster-or-vector.html, Oct. 19, 2009.

Anonymous: "Flash Tutorial—Forms", tizag.com, URL: http://www.tizag.com/flashTutorial/flashforms.php, Nov. 26, 2005.

Anonymous, "Building Web Forms in Flash", URL: http://web.archive.org/web/20100208151847/http://www.devshed.com/c/a/Flash/Building-Web-forms-In-Flash, Aug. 7, 2002.

* cited by examiner

APPARATUS, SYSTEM AND METHOD FOR A VECTOR-BASED FORM FIELD DOCUMENT

CROSS-REFERENCE TO RELATED APPLICATIONS

This application claims priority to U.S. Provisional Patent Application No. 61/451,509 entitled "Apparatus, System, and Method For a Vector-Based Form Field Document" and filed on Mar. 10, 2011 for Jason Porter Rickabaugh, which is incorporated herein by reference.

FIELD

The subject matter disclosed herein relates to vector-based documents and more particularly relates to vector-based form field documents.

BACKGROUND

Description of the Related Art

Documents and forms are often available for download on the Internet, or distributed by electronic communication such as email. These documents may include legal documents, agreements between parties, applications, and the like. Often, a user may fill in data in these documents.

Often, these documents are in the form of Portable Document Format ("PDF") documents from Adobe® or Microsoft® Word® documents. Documents in these formats may be large and difficult to distribute among various users. Furthermore, applications that present documents in these formats may be resource intensive.

SUMMARY

From the foregoing discussion, it should be apparent that a need exists for an apparatus, system, and method for a vector-based form field document. Beneficially, such an apparatus, system, and method would insert form fields onto a vector-based document.

The present invention has been developed in response to the present state of the art, and in particular, in response to the problems and needs in the art that have not yet been fully solved by currently available form field documents. Accordingly, the present invention has been developed to provide an apparatus, system, and method for a vector-based form field document that overcome many or all of the above-discussed shortcomings in the art.

An apparatus for a vector-based form field document is disclosed. A method and computer program product also perform the functions of the apparatus. The apparatus, in one embodiment, includes a reference module, a loading module, and an insertion module. The reference module, in one embodiment, references document content for a vector-based document and references form field information corresponding to the document content. The loading module, in one embodiment, loads the document content in a vector-based document viewer. The insertion module, in one embodiment, inserts one or more form fields onto the document content in the viewer. The one or more form fields may be inserted based on the form field information and each form field may include a field for user input.

In one embodiment, which may be combined with any of the embodiments above, the vector-based document includes a playback file including vector graphics and video and/or audio. In one embodiment, which may be combined with any of the embodiments above, the vector-based document includes a Shockwave Flash ("SWF") file and/or an XML Paper Specification ("XPS") file.

In one embodiment, which may be combined with any of the embodiments above, the apparatus includes an instance creation module creating a plurality of document object instances from the document content. Each document object instance may display a single page of the vector-based document. In a further embodiment, which may be combined with any of the embodiments above, the apparatus includes a dynamic scrolling module displaying a plurality of pages of the vector-based document with the plurality of document object instances. In one embodiment, which may be combined with any of the embodiments above, the dynamic scrolling module moves a first document object instance displaying a first page to a position below a second document object instance displaying a second page in response a user scrolling the first page out of a viewable area and scrolling the second page into the viewable area. In a further embodiment, which may be combined with any of the embodiments above, the apparatus includes a dynamic scrollbar module managing a position of the plurality of document object instances in the vector-based document. In one embodiment, which may be combined with any of the embodiments above, the insertion module inserting one or more form fields onto the document content in the viewer further includes the insertion module inserting one or more form fields onto a particular page in response to the particular page becoming an active page in the viewer.

In one embodiment, which may be combined with any of the embodiments above, the insertion module links each of the one or more form fields to a data object. In one embodiment, which may be combined with any of the embodiments above, the reference module references the document content combined with the form field information. In one embodiment, which may be combined with any of the embodiments above, the reference module references the document content separately from the form field information.

In one embodiment, which may be combined with any of the embodiments above, the apparatus includes a signature module providing a signature component onto the document content in the viewer. In one embodiment, which may be combined with any of the embodiments above, the signature component is for electronically signing the vector-based document. In one embodiment, which may be combined with any of the embodiments above, the signature module processes an electronic signature from a user by way of the signature component. In one embodiment, which may be combined with any of the embodiments above, the signature module replaces the signature component on the document content with a signature token in response to processing the electronic signature.

In one embodiment, which may be combined with any of the embodiments above, the apparatus includes a finalization module finalizing the vector-based document. In one embodiment, the finalized vector-based document includes user input and/or an electronic signature. In one embodiment, which may be combined with any of the embodiments above, the apparatus includes a document server providing the vector-based document and receiving one or more requests for the vector-based document. In one embodiment, which may be combined with any of the embodiments above, the apparatus includes a client including the vector-based document viewer. In one embodiment, which may be combined with any of the embodiments above, the vector-based document viewer requests the vector-based document from a the document server in response to the client loading a web page including embedded tags for loading the vector-based document viewer and referencing the vector-based document. In one embodiment, which may be combined with any of the embodiments above, the vector-based document viewer sends a request to the document server. The vector-based document viewer may receive the vector-based document from the document server.

In one embodiment, which may be combined with any of the embodiments above, the apparatus includes a web page server providing the web page including embedded tags for loading the vector-based document viewer. In one embodiment, which may be combined with any of the embodiments above, the apparatus includes a conversion module receiving a base document input by a user. In one embodiment, which may be combined with any of the embodiments above, the conversion module extracts form field information from the base document. In one embodiment, which may be combined with any of the embodiments above, the conversion module converts the document content into at least a portion of a vector-based document. In one embodiment, which may be combined with any of the embodiments above, the conversion module saves the form field information as metadata corresponding to the document content.

In one embodiment, which may be combined with any of the embodiments above, the apparatus includes an edit module presenting the document content and the form field information to the user in an editable display responsive to user input. In one embodiment, which may be combined with any of the embodiments above, the apparatus includes a management module modifying the form field information in response to user interaction with the editable display. In one embodiment, which may be combined with any of the embodiments above, the apparatus includes a notification module sending an electronic message comprising a tokenized link to a user. The tokenized link may allow the user to access the vector-based document.

The method for a vector-based form field document includes, in on embodiment, referencing document content for a vector-based document and referencing form field information corresponding to the document content. The method, in one embodiment, includes loading the document content in a vector-based document viewer. In one embodiment, the method includes inserting one or more form fields onto the document content in the viewer. The one or more form fields may be inserted based on the form field information and each form field may include a field for user input.

In one embodiment, which may be combined with any of the embodiments above, the method includes creating a plurality of document object instances from the document content. In one embodiment, which may be combined with any of the embodiments above, each document object instance is for displaying a single page of the vector-based document. In one embodiment, which may be combined with any of the embodiments above, the method includes displaying a plurality of pages of the vector-based document with the plurality of document object instances. In certain embodiments, which may be combined with any of the embodiments above, the method includes moving a first document object instance displaying a first page to a position below a second document object instance displaying a second page in response a user scrolling the first page out of a viewable area and scrolling the second page into the viewable area.

The computer program product for a vector-based form field document includes a computer readable storage medium having computer readable program code embodied therein. In one embodiment, the computer readable code is configured to reference document content for a vector-based document and reference form field information corresponding to the document content. In one embodiment, the computer readable code is configured to load the document content in a vector-based document viewer. In one embodiment, the computer readable code is configured to insert one or more form fields onto the document content in the viewer. In one embodiment, the one or more form fields are inserted based on the form field information and each form field includes a field for user input.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
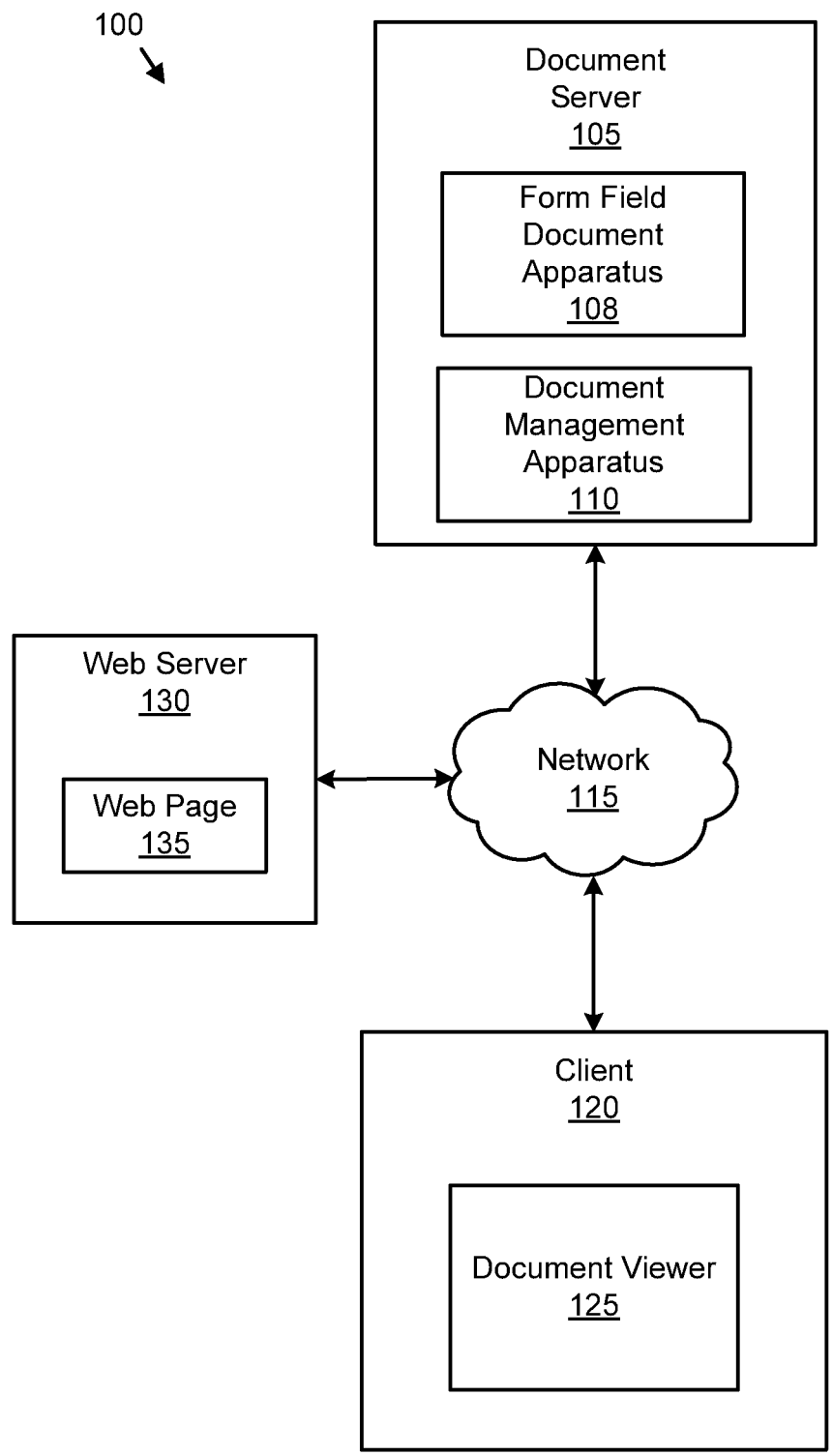
FIG. 1 is a schematic block diagram illustrating one embodiment of a system for a vector-based form field document in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including Flash or an object oriented programming language such as Java, Smalltalk, C++, Flex, ActionScript, .NET, PHP, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 illustrates one embodiment of a system for a vector-based form field document in accordance with the present invention. The system 100 includes a document server 105 with a form field document apparatus 108 and a document management apparatus 110, a network 115, a client 120 with a document viewer 125, and a web server 130 with a web page 135. The document server 105 may host, store, and/or provide vector-based documents for access, and/or download over the network 115 by the client 120. The document server 105 may execute one or more applications to support a vector-based document application environment for providing vector-based documents. A vector-based document refers to an electronic document and/or electronic file having vector-based graphics, which includes fonts, glyphs, and/or the like. In one embodiment, the vector-based documents provided by the document server 105 may include playback files with vector graphics, video and/or audio. Furthermore, in one embodiment, the vector-based document is a Shockwave Flash ("SWF") file for a Flash® application environment or an XML Paper Specification ("XPS") file for a Microsoft® Silverlight® application environment. In other embodiments, any suitable file format supporting vector-based graphics may be used. Similarly, the vector-based document application environment of the document server 105 may be a Flash® application environment, a Silverlight® application environment, or other suitable application environment.

The document server 105 may host, store, and/or provide, to clients 120, vector-based form field documents as described below. The document server 105 may provide vector-based documents along with (e.g. embedded inside) web pages and/or provide vector-based documents to web pages referencing such vector-based documents (e.g. on servers besides the document server 105 such as the web server 130). In one embodiment, the document server 105 may receive a request for a particular vector-based document from a client 120 in response to the client 120 loading, from the web server 130, a web page 135 with embedded code referencing the particular vector-based document. The document server 105 may communicate the vector-based document to the client 120. For example, a particular web page 135 may have embedded tags that reference a vector-based document on the document server 105. A browser loading the web page 135 provided by the web server 130 may load a document viewer (for viewing vector-based documents as described below) in the embedded tags and the document viewer may load the vector-based document.

The web server 130 may be separate and distinct from the document server 105. In one embodiment, the web server 130 is independent of the document server 105. Specifically, the web server 130 may be a third-party web server 130 operated independently of the document server 105 and/or managed by a different entity. The web server 130, although independent of the document server 105, may include embedded tags that reference a vector-based document from the document server 105.

The document server 105 may be embodied as a computing device including a desktop computer, a portable computer, a server, a mainframe computer, and the like. The document server 105 may include memory storing computer readable programs. The document server 105 may include a processor that executes the computer readable programs as is well known to those skilled in the art. The computer readable programs may be tangibly stored in storage in communication with the document server 105. Although FIG. 1 depicts a single document server 105, one skilled in the art realizes that the system 100 may include multiple document servers 105.

The document server 105 includes a form field document apparatus 108 and a document management apparatus 110, described below. Although in the depicted embodiment, the document server 105 includes both the form field document apparatus 108 and the document management apparatus 110, in certain embodiments, the document server 105 may be embodied with either the form field document apparatus 108 or document management apparatus 110 alone and/or be in communication with the form field document apparatus 108 and/or the document apparatus 110 residing on another server. The network 115 may comprise a global communications network such as the Internet, a Local Area Network ("LAN"), multiple LANs communicating over the internet, or any other similar communications network.

The client 120 may communicate with the document server 105 through the network 115 to access, reference, retrieve, and/or download vector-based documents. The client 120 may be embodied as a desktop computer, a portable computer, a server, a mainframe computer, a handheld computing device, a touch device, a personal desktop assistant ("PDA"), a table computer, an e-Book reader, a mobile phone, a Smart-phone, and the like. Furthermore, although FIG. 1 depicts a single client 120, multiple clients 120 may communicate with the document server 105 through the network 115.

The client 120 may include a document viewer 125 to display, reference, and/or access a vector-based document from the document server 105. In one embodiment, the document viewer 125 is a vector-based document viewer. The document viewer 125 may be embodied as an application executing on the client 120. The document viewer 125 may be embodied as a web-browser, as a plug-in to a web browser, an application executing in conjunction with a web-browser, and/or an application independent of a web-browser. In one embodiment, the document viewer 125 is a Flash® player from Adobe®, a Silverlight® player from Microsoft®, or any suitable viewer capable of downloading and/or displaying a vector-based document.

In one embodiment, the form field document apparatus 108 provides a vector-based document with editable form fields. Specifically, the form field document apparatus 108 may overlay, insert and/or maintain editable form fields on vector-based document content. Furthermore, the form field document apparatus 108 may coordinate movement of the editable form fields such that they move with the document content as the user scrolls the document content up or down. Furthermore, the form field document apparatus 108 may make the editable form fields otherwise appear as part of the document content.

These vector-based form-field documents may be used for user input forms, signature documents, and the like. Because the vector-based nature of the form-field documents greatly reduces their size, these vector-based form field documents are more readily downloadable by clients 120 and/or shared amongst other clients 120. Furthermore, in one embodiment, the vector-based form field documents of the form field document apparatus 108 are compatible with pre-existing document viewers 125, such as Flash® players from Adobe® and Silverlight® players from Microsoft®, which are available as standalone applications or accompanying many web-browsers. Moreover, the file size of a vector-based form field document may be much smaller in comparison to PDF version of the document.

In certain embodiments, the form field document apparatus 108 or a portion of the form field document apparatus 108 is embodied as a vector-based document and/or file that includes a vector-based document. For example, the form field document apparatus 108 may be embodied as a SWF file. In these embodiments, the client 120 may download the form field document apparatus 108 from the document server 105 for access in the document viewer 125 and the form field document apparatus 108 may reside in volatile or non-volatile memory on the client 120. Consequently, at least a portion of the form field document apparatus 108 may also reside on the client 120.

In one embodiment, the client 120 (e.g. a browser or other application on the client 120) processes and/or loads a web page including embedded tags for requesting, loading, and/or referencing a particular vector-based form field document. The web page may be provided by a second server (e.g. a web server 130) different from the document server 105 as described above. The second server may be a third party server independent of the document server 105. The browser may load the document viewer 125 into the embedded tags and the document viewer 125 may send a request to the document server 105 for a vector-based document (e.g. a vector-based form field document) e.g. a vector-based form field document) e.g. a vector-based form field document) and receive from the document server 105 a particular vector-based form field document to display in the document viewer 125. In this manner, the document server 105 may include a library of vector-based form field documents that other websites, such as those hosted and/or provided by other web servers 130, may reference using embedded tags. For example, an insurance company may use embedded tags on the Hyper Text Markup Language ("HTML") code of its web page to reference an SWF file, hosted by the document server 105 and embodying a vector-based form field document, of an insurance contract.

In certain embodiments, the document viewer 125 may include at least a portion of the form field document apparatus 108 as part of the document viewer 125 and/or a plug-in to the document viewer 125. The form field document apparatus 108 may be embodied across the document server 105, the client 120, and the document viewer 125 in any suitable form. In one embodiment, the form field document apparatus 108 is essentially self contained and includes instructions to combine a vector-based document with form fields. In another embodiment, the form field document apparatus 108 includes a portion of executable code on the client 120 and another portion in the vector-based document and/or file that includes the vector-based document. In yet another embodiment, the form field document apparatus 108 includes instructions on the client 120 and the document is free of instructions to combine form fields and an underlying vector-based document.

As stated above, in certain embodiments, the document server 105 includes a document management apparatus 110. The document management apparatus 110 may convert documents of various formats into vector-based form-field documents described above. The document management apparatus 110 may also allow a user to edit and customize form fields in a document, establish users who will receive the document (participants), notify one or more participants of the existence of the document, grant one or more participants access to the document, finalize the document after one or more participants have electronically signed the document, and/or the like. In certain embodiments, the document viewer 125 may include at least a portion of the document management apparatus 110 as part of the document viewer 125 and/or a plug-in to the document viewer 125. The document management apparatus 110 may be embodied across the document server 105, the client 120, and the document viewer 125 in any suitable form.

Figure 2:
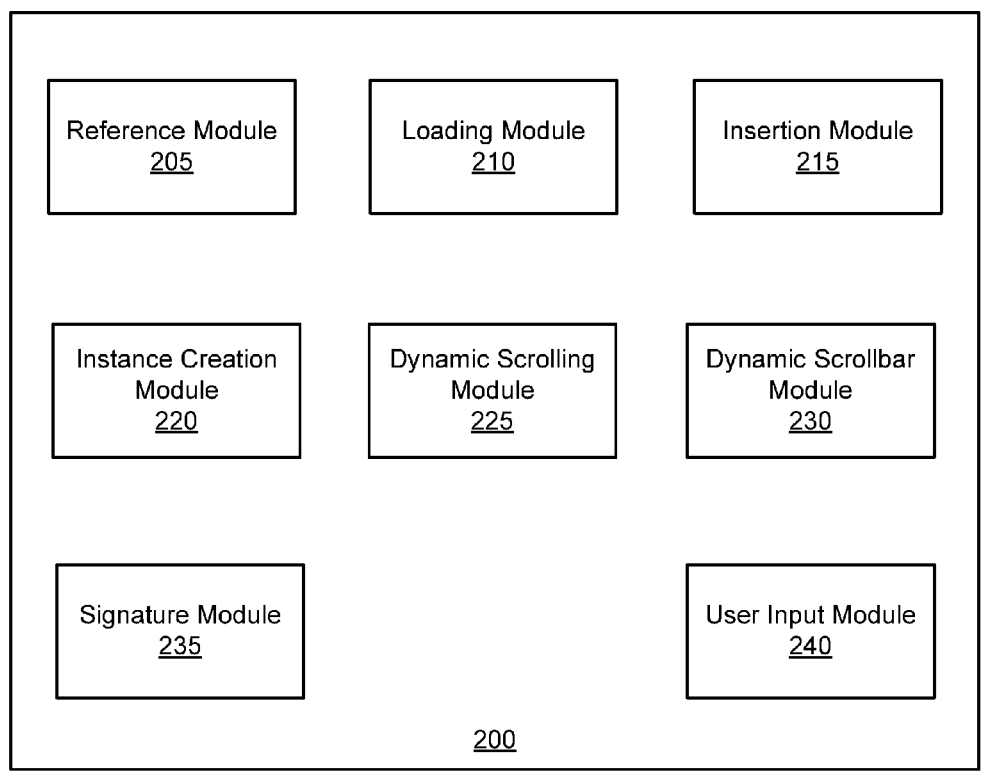
FIG. 2 is a schematic block diagram illustrating one embodiment of an apparatus for a vector-based form field document in accordance with the present invention.

FIG. 2 illustrates one embodiment of an apparatus 200 for a vector-based form field document in accordance with the present invention. The apparatus 200 may comprise one embodiment of the form field document apparatus 108. The description of the apparatus 200 refers to elements of FIG. 1, like numbers referring to like elements. The depicted apparatus 200 includes a reference module 205, a loading module 210, an insertion module 215, an instance creation module 220, a dynamic scrolling module 225, a dynamic scrollbar module 230, a signature module 235, and a user input module 240.

The reference module 205 references document content for a vector-based document. Referencing may include downloading, reading from storage, and the like. The document content may include vector-graphics, text, and/or other portions of a vector-based document. In certain embodiments, the document content may include video data, audio data, raster graphics, streaming media, and the like. In addition, in one embodiment, the document content may include raster graphics and no vector graphics. For example, vector graphics may be unavailable for a certain document. In certain embodiments, the document content may include embedded form-fields and/or form field information. In one embodiment, the document content is embodied by at least a portion of a vector-based document and/or file such as a SWF or XPS file and/or data that is otherwise displayable by a document viewer 125.

The reference module 205 may also reference form field information corresponding to the referenced document content. In one embodiment, the form field information is metadata. The form field information may include information for characteristics of form fields including, but not limited to, position on page, height, width, x, y, coordinates, field name, read/write, visibility, tab order, and/or other metadata. Each form field may be a field for user input. Form fields may include but are not limited to textinput, textarea, dropdown list/combo boxes, check boxes, radio buttons, checkbox groups, radio button groups, drawing areas, and the like. In one embodiment, the form field information approximates the appearance of form fields (or locations in a base document where a form field may be inserted) in a base document converted to a vector-based form field document as described below.

In one embodiment, the reference module 205 references the document content combined with the metadata (e.g. combined in an SWF file with the document content). In some embodiments, the reference module 205 references the document content separately from the form field information. The reference module 205 may reference the document content from a first location, such as on the document server 105, and reference the form field information from a second location, such as in a different location on the document server 105 or from another server.

As stated above, in one embodiment, the vector-based document is embodied as a playback file with vector graphics and one or more of video and audio. In one embodiment, the vector-based document is embodied as a Shockwave Flash ("SWF") file, an XML Paper Specification ("XPS") file, and/or the like.

In one embodiment, the reference module 205 is triggered by vector-based document viewer requesting a vector-based document from a document server 105 in response to a client loading a web page including embedded tags for loading the vector-based document viewer 125 and referencing the vector-based document. The vector-based document viewer 125 may send a request to the document server 105. The vector-based document viewer 125 may receive the vector-based document from the document server 105. As stated above, the web page may be provided by a second server different, independent, and/or external from the document server 105.

The loading module 210 loads the document content in a document viewer 125. In one embodiment, the loading module 210 loads the document content as a document object. As used herein, a document object refers to a data structure loaded and displayed by a document viewer 125 such as a Flash® player. In one embodiment, loading the document content includes providing the document content as a document object which the document viewer 125 loads and displays. In another embodiment, the loading module 210 loads the document content with as a dynamic scrolling object as described below.

The insertion module 215 inserts one or more form fields onto the document content in the document viewer 125 such that the document viewer 125 displays a vector-based form field document. The insertion module 215, in one embodiment, inserts the one or more form fields based on the metadata. Specifically, the form field information in the metadata may identify a position on the document content for a form field along with the size and other characteristics of the form field.

In one embodiment, the insertion module 215 inserts one or more form fields onto a particular page of the vector-based document in response to the particular page becoming an active page in the document viewer 125. A page may be considered an active page when at least a portion of the page is visible to a user in the document viewer 125, the page is adjacent to a visible page, and the like. In one embodiment, the insertion module 215 links each of the one or more form fields to a data object. In one embodiment, the form fields include a tab order with indexed form fields for when a user presses the tab key to move from one field to another. Furthermore, in one embodiment, the insertion module 215 coordinates movement of the editable form fields such that they move with the document content as the user scrolls the document content up or down.

In certain embodiments, the insertion module 215 inserts form fields based on an identity of a user/participant/document viewer 125. For example, if an author of the document has locked certain form fields, or hidden certain form fields from a particular user, the particular user will be unable to see hidden form fields or be unable to edit locked form fields. Furthermore, in some embodiments, certain form fields may be pre-populated with data values as described in greater detail below. In one embodiment, the insertion module 215 pre-populates form fields by way of an XML web service, a REST web service, JavaScript Object Notation ("JSON"), Action Message Format ("AMF"), and the like.

The instance creation module 220 creates a plurality of document object instances from the document content. Each document object instance may display a single page of the vector-based document. In one embodiment, the document viewer 125 is not configured to display a continuous, multi-page scrolling document and displays a single page of the vector-based document per document instance. Therefore, the instance creation module 220 may create a plurality of document object instances such that the dynamic scrolling module may simulate a continuous multi-page document in such a document viewer 125 as described below.

The dynamic scrolling module 225 displays a plurality of pages of the vector-based document with the plurality of document object instances. In one embodiment, the dynamic scrolling module 225 moves a first document object instance displaying a first page to a position below a second document object instance displaying a second page in response a user scrolling the first page out of a viewable area and scrolling the second page into the viewable area using a scrollbar or other scrolling control of the document viewer 125. As a result, the dynamic scrolling module 225 may simulate a continuous multi-page scrolling document using multiple document object instances "stacked" in such a manner. In one embodiment, the dynamic scrolling module 225 loads a portion of the document to be currently viewed (i.e. screen full, page, paragraph, etc.) and loads a portion of the document above and below the currently viewed portion, while the remainder of the document is not loaded into memory. In the embodiment, when the document is scrolled down, the dynamic scrolling module 225 unloads the portion of the document that is above the currently viewed section, displays the portion below the currently viewed section (which becomes a new currently viewed section), and loads a portion of the document following the new currently viewed section. In this way, the entire document need not be loaded into memory. The user may freely scroll the document up and down and it appears as one complete document. The user can also use a hand tool to grab the document with a mouse pointer, and move the document around.

The dynamic scrollbar module 230 manages a position of the plurality of document object instances in the vector-based document. The dynamic scrollbar module 230 may provide a scrollbar or other similar navigation control that represents the actual size of the document and is linked to the dynamic scrolling object that maintains position of viewable object instances. The dynamic scrollbar module 230 may also maintain a current position (e.g. the active page visible to the user) in the vector-based document and depict the current position in the scrollbar that allows the user to scroll through pages of the vector-based document.

For example, if the vector-based document has five pages and the user is currently viewing page 3, the dynamic scrollbar module 230 may set the scrollbar selector to a middle position on the scrollbar. The dynamic scrollbar module 230 may signal the dynamic scrolling module 225 to scroll up or down through the document in response to the user moving the scrollbar indicator up or down.

The signature module 235 provides and/or inserts a signature component (e.g. a signing block or the like) onto the document content in the viewer. In one embodiment, a user's signature of the vector-based document indicates that the user accepts the terms of document. A user may use the signature component to electronically sign the vector-based document. In one embodiment, the signature module 235 processes an electronic signature from a user by way of the signature component. Processing the electronic signature may include communicating with the document server 105 or another server to validate the electronic signature. The signature module 235 may mark the signature data with an indicator to set the signature data apart from other form field data which is transmitted to the document server 105. In one embodiment, the signature module 235 may transmit signature data to the document server 105 in a separate transaction. In some embodiments, the signature module 235 replaces the signature component on the document content with a signature token in response to processing the electronic signature. The signature token may include an image, or other indicator that the user has electronically signed the document.

The signature module 235 may use a variety of methods for allowing a user to electronically sign a document. In one embodiment, the signing component has an arbitrate method or widget used to sign the document in accordance with E-Sign laws for a particular jurisdiction. The signature component may include a text field with a button where the user can type in a legal name and press the sign button. The signature module 235 may also interact with a computer peripheral device such as a signing pad, electronic signature method or other server interactive signing methods such as a telephone pin signature where the user is prompted for his or her telephone number and a computerized telephone system sends an SMS message with a pin or calls the user via a voice line and plays back a pre-recorded message with a pin number. The user would then type that pin into a dialog and press a button to sign.

The user input module 240 receives, references, stores, and/or validates user input in the form fields. The user input module 240 may validate user input using client side and/or server side validation. For example, the user input module 240 may verify that letters are not input in a particular form field designated for numerical input (e.g. the user enters 'a' in a form field expecting numbers). The user input module 240 may prompt a warning display and/or ignore user attempts to enter input inconsistent with a form field specification.

Figure 3:
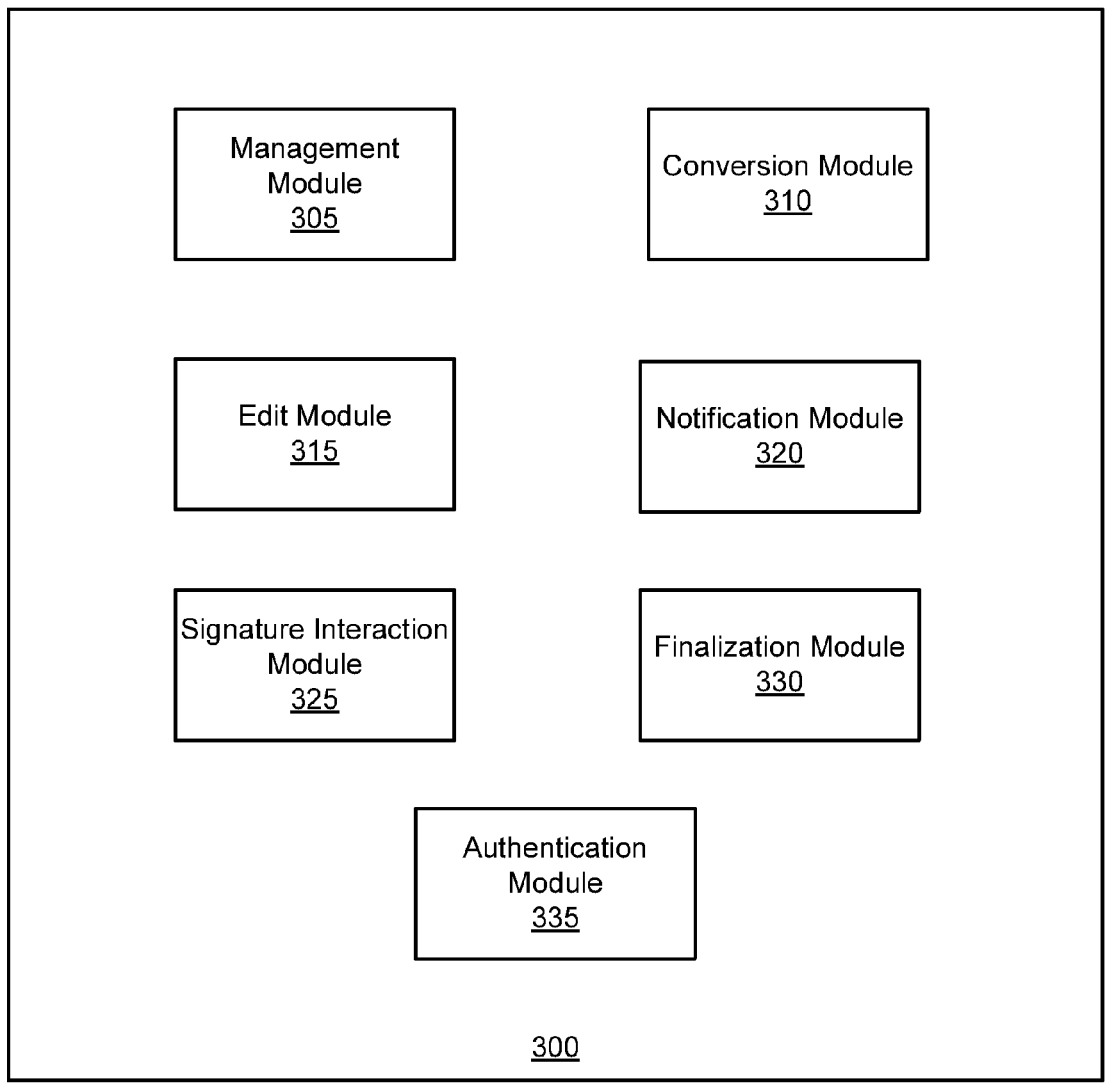
FIG. 3 is a schematic block diagram illustrating one embodiment of an apparatus for a vector-based form field document in accordance with the present invention.

FIG. 3 illustrates one embodiment of an apparatus 300 for a vector-based form field document in accordance with the present invention. The apparatus 300 may comprise one embodiment of the document management apparatus 110. The depicted apparatus 300 may include one or more of a management module 305, a conversion module 310, an edit module 315, a notification module 320, a signature interaction module 325, a finalization module 330, and an authentication module 335.

The management module 305 allows a user to upload files and documents, setup a workflow, and arrange to send notifications to other users that they have documents that need attention. The management module 305 may also allow a user, such as a document author, to designate one or more participants to which to send a particular vector-based form field document and may allow a user to lock certain form fields and/or set the visibility of certain form fields for particular participants as described below. The management module 305 may initiate notification of a user regarding a vector-based form field document as part of a workflow (e.g. a document author configures a vector-based form field document to be sent to a certain number of participants in a certain order). In one embodiment, the management module 305 initiates notification of a user, manages documents, and manages, maintains, and/or initiates a workflow using a web service including, but not limited to, an Extended Markup Language ("XML") web service, a Representational State Transfer ("REST") web service, and the like. In one embodiment, the management module 305 initiates notification of a user, manages documents, and manages, maintains, and/or initiates a workflow using a web service including, but not limited to, an Extended Markup Language ("XML") web service, a Representational State Transfer ("REST") web service, and the like. In addition, in one embodiment, a user may access a vector-based form field document without being notified. In this embodiment, the management module 305 may begin a workflow after a user interaction with a vector-based form field document (e.g. a user submits information on form fields of a vector-based form field document). Specifically, a web page may include embedded tags that instruct a browser loading the web page to load the document viewer 125 to display a specified vector-based form field document. A user may interact with the vector-based form field document from these web pages without being first notified. The management module 305 may detect and/or be notified of a user interaction with a particular vector-based form field document and the management module 305 may initiate a workflow, take a particular action, and the like. For example, the management module 305 may forward the particular vector-based form field document to another user as part of the workflow, notify a representative affiliated with the web page, and the like. In this manner, the document server 105 may offer various vector-based form field documents that web pages, including web pages not affiliated with the document server 105, may reference to provide various forms for users.

The conversion module 310, in one embodiment, converts documents into vector-based documents with corresponding form field information. In one embodiment, the conversion module 310 receives a base document input by a user. The base document may be a Portable Document Format ("PDF") document, a Word document, a PostScript document, and the like. In one embodiment, the conversion module 310 converts a non-PDF document into a PDF document, which the conversion module then converts into a vector-based document. In one embodiment, the conversion module 310 removes certain content while converting the base document into the vector-based document such as links, audio, video, and the like. In one embodiment, the conversion module 310 retrieves user input data from form fields in the base document (e.g. a PDF) and inserts the user input information into corresponding form fields in the vector-based document.

The conversion module 310 extracts form field information from the base document, converts the document content into at least a portion of a vector-based document, and saves the form field information as metadata corresponding to the document content. The conversion module 310 may save the metadata to storage such as flat file, mark up file, database, and the like.

The conversion module 310 may use various methods, APIs, web services, and/or tools to convert base documents into vector-based documents. In one embodiment, the conversion module 310 converts base documents to SWF file content using an external binary. In one embodiment, the conversion module 310 uses a virtual printer to convert the base document to a XPS file.

The edit module 315, in one embodiment, presents the document content and the form field information to the user in an editable display responsive to user input. The edit module 315 modifies the form field information in response to user interaction with the editable display. The edit module 315, in one embodiment, allows a user to drag and drop form fields, resize form fields, reposition form fields, draw form fields, set a tab order, designate a tab algorithm, and/or edit form field metadata. In one embodiment, the edit module 315 allows a user to lock certain form fields and/or set the visibility of certain form fields for particular participants or all participants and/or other users who view the document. In one embodiment, the edit module 315 allows a user to pre-populate certain form fields. As a result, when the document is sent to a participant who views the document, those certain form fields may include information designated by the document author. The edit module 315 may associate a form field with a value key corresponding to a value in a text block, XML file, and the like, for pre-populating the form field. In one embodiment, prepopulation of form fields is initiated by a web service including an XML web service, a REST web service, and the like.

The edit module 315 may allow a user to change order of participants, grouping, tab order, and the like of the vector-based document. In addition, the edit module 315 may allow a user to edit the number, identity, and order of the participants that will interact with the document.

In one embodiment, the notification module 320 notifies a user and/or participant of a vector-based document. The notification module 320 may notify a user/participant in response to a signal from the management module 305 (e.g. as part of a workflow managed by the management module 305), a command from a document author to notify a participant, and the like. The notification module 320 may notify a user with an e-mail, text message, instant message, and the like. In one embodiment, the notification module 320 sends an electronic message comprising a tokenized link to a user. The tokenized link may allow the user to access the vector-based document and be authenticated to view the vector-based document. In one embodiment, the electronic message is an e-mail message.

The signature interaction module 325, in one embodiment, may communicate with the signature module 235 to receive signature information from the vector-based document. The signature interaction module 325 may receive signature data with form field data and/or may receive signature data in a distinct transaction. The signature interaction module 325 may also interact with third-party electronic signature applications, servers, Application Programming Interfaces ("API's) and the like.

The finalization module 330, in one example, finalizes the vector-based document. The finalized vector-based document includes document content, user input, and/or an electronic signature. In one embodiment, once the user has completed filling out the form fields, the user may press a submit button or other input to send the form field data back to the document server 105. In one embodiment, the finalization module 330 saves form field information to a file and digitally signs the file. In one embodiment, the finalization module 330 finalizes the document after each user that the document author intended to supply information to and/or sign the document has done so.

In one embodiment, the finalization module 330 creates a Portable Document Format ("PDF") file or an XPS file based on the document content and the form field information with entries from one or more users. In a further embodiment, the finalization module 330 retrieves a base document for the vector-based document and inserts the form field entries and/or signature information onto the base document. The finalization module 330 may then notify the participants that the finalized file is ready. The PDF file created by the finalization module 303 may be a different file from an original PDF base document converted by the conversion module 310 in a vector-based document (although the two documents may appear similar).

In one embodiment, the authentication module 335 authenticates a user to allow the user to access a vector-based form field document. In one embodiment, the authentication module 335 may receive a request with authentication information in response to a user clicking on a tokenized link with embedded authentication information. In some embodiments, the authentication module 335 interacts with third-party authentication frameworks such as Single Sign On ("SSO") to authenticate a user via external accounts such as Facebook, Google or Gmail, MSN, and the like.

Figure 4:
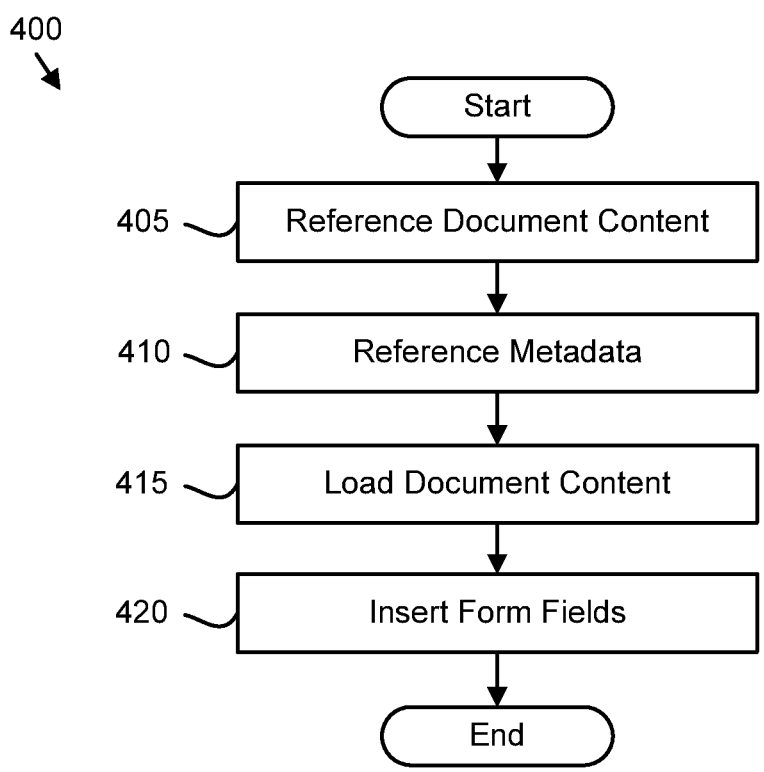
FIG. 4 is a schematic flow chart diagram illustrating one embodiment of a method for a vector-based form field document in accordance with the present invention.

FIG. 4 illustrates one embodiment of a method 400 for a vector-based form field document in accordance with the present invention. The method 400 may substantially include the steps to carry out at least a portion of the functions presented above with respect to the operation of the described apparatus and system of FIGS. 1-2. The description of the method 400 refers to elements of FIGS. 1-2, like numbers referring to like elements.

The method 400 starts and the reference module 205 references 405 document content for a vector-based document. Next, the reference module 205 references 410 metadata. The metadata may include form field information corresponding to the document content. The loading module 210 then loads 415 the document content in a document viewer 125. The insertion module 215 inserts 420 one or more form fields onto the document content in the viewer. The insertion module 215 may insert the form fields based on the metadata. Furthermore, each form field may include a field for user input. Then, the method 400 ends.

Figure 5:
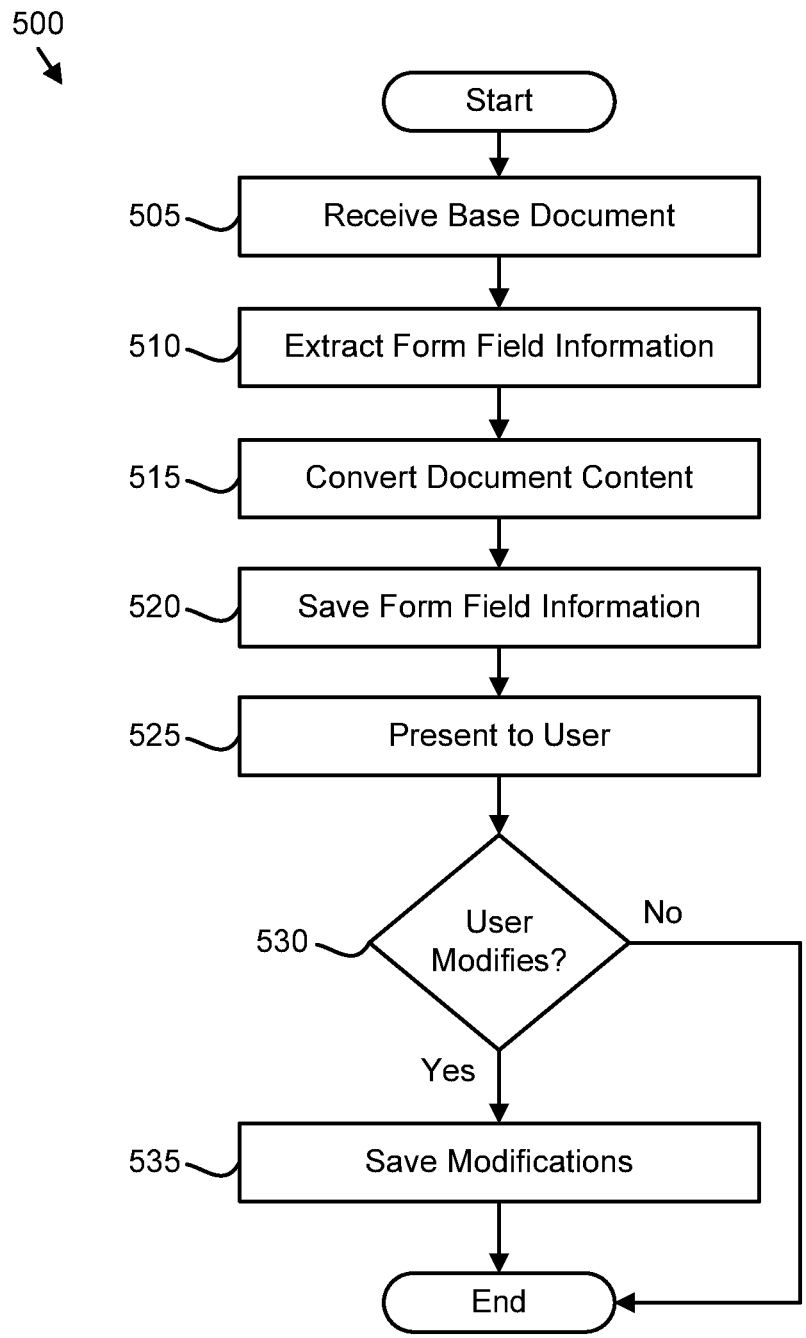
FIG. 5 is a schematic flow chart diagram illustrating one embodiment of a method for a vector-based form field document in accordance with the present invention.

FIG. 5 illustrates one embodiment of a method for a vector-based form field document in accordance with the present invention. The method 500 may substantially include the steps to carry out at least a portion of the functions presented above with respect to the operation of the described apparatuses and system of FIGS. 1-3. The description of the method 500 refers to elements of FIGS. 1-3, like numbers referring to like elements.

The method 500 begins and the conversion module 310 receives 505 a base document input by a user. The conversion module 310 then extracts 510 form field information from the base document. Next, the conversion module 310 converts 515 the document content into at least a portion of a vector-based document. The conversion module 310 then saves 520 the form field information as metadata corresponding to the document content. The edit module 315 presents 525 the document content and the form field information of the vector-based form field document to the user in an editable display responsive to user input. If the user modifies 530 the form field information (and chooses to persist the changes), the management module 305 saves 535 the form field information modifications and the method 500 ends. Otherwise, the method 500 ends.

Figure 6:
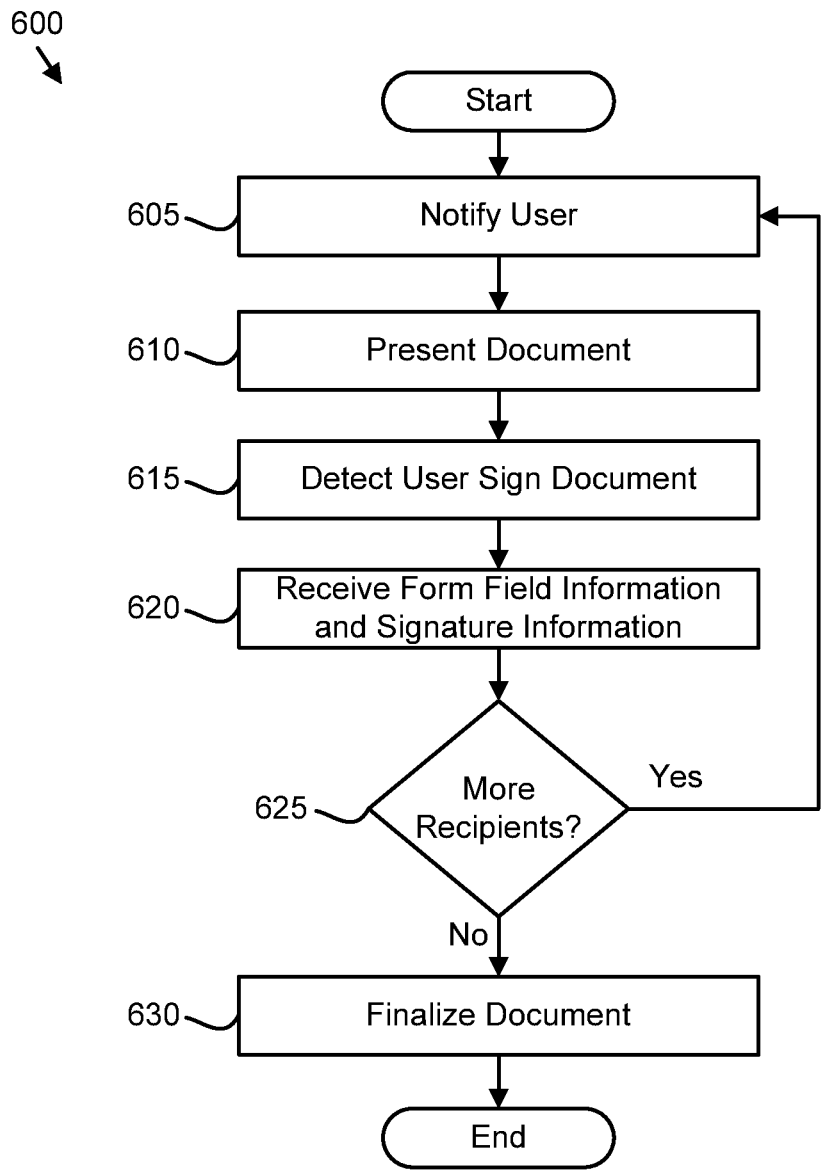
FIG. 6 is a schematic flow chart diagram illustrating another embodiment of a method for a vector-based form field document in accordance with the present invention.

FIG. 6 illustrates another embodiment of a method 600 for a vector-based form field document in accordance with the present invention. The method 600 may substantially include the steps to carry out at least a portion of the functions presented above with respect to the operation of the described apparatuses and system of FIGS. 1-3. The description of the method 600 refers to elements of FIGS. 1-3, like numbers referring to like elements.

The method 600 begins and the notification module 320 notifies 605 a user of availability of a vector-based document. In certain embodiments, the notification module 605 and the authentication module 335 may authenticate a user. Specifically, the notification module 320 may, in certain embodiments, send an electronic message including a tokenized link to a user. The tokenized link allows the user to access the vector-based document. The authentication module 335 may validate 610 the user (e.g. in response to the user selecting the tokenized link). In other embodiments, other forms of authentication may be used. In certain embodiments, a user is not authenticated or validated, just notified of a vector-based document.

Next, the reference module 205, loading module 210, and insertion module 215 present 610 the vector-based document as described above in relation to FIG. 4. The signature interaction module 325 detects 615 the user sign the vector-based document with the signature component. The document server 105 and/or management module 305 receives 620 the form field information and signature information. If the document author has selected more recipients 625 for the vector-based document, the method 600 returns to step 605. Alternatively, the finalization module 330 finalizes 630 the vector-based document and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for a vector-based form field document, the apparatus comprising:
   a reference module for referencing document content for a vector-based document and for referencing form field information corresponding to the document content, the form field information being extracted from a base document comprising one or more form fields;
   an instance creation module for creating one or more document object instances from the document content, the one or more document object instances associated with one or more pages of the vector-based document;
   a loading module for loading the one or more document object instances in a vector-based document viewer;
   a dynamic scrolling module for displaying the one or more pages of the vector-based document with the one or more document object instances such that a first document object instance displaying a first page is moved to a position below a second document object instance displaying a second page in response to the first page being removed from a viewable area and the second page being moved into the viewable area; and
   an insertion module for inserting one or more form fields onto the one or more pages in the viewer, the one or more form fields inserted based on the form field information such that an appearance of each form field approximates an appearance of a corresponding form field of the base document, each form field comprising a field for user input;
   wherein the reference module, the instance creation module, the loading module, the dynamic scrolling module, and the insertion module comprise one or more of logic hardware and executable code stored on a non-transitory computer readable storage medium.

2. The apparatus of claim 1, wherein the vector-based document comprises a playback file comprising vector graphics and one or more of video and audio.

3. The apparatus of claim 1, wherein the vector-based document comprises one of a Shockwave Flash ("SWF") file and an XML Paper Specification ("XPS") file.

4. The apparatus of claim 1, wherein the dynamic scrolling module moves the first document object instance displaying the first page to a position below the second document object instance displaying the second page in response to a user scrolling the first page out of the viewable area and scrolling the second page into the viewable area.

5. The apparatus of claim 4, further comprising a dynamic scrollbar module for managing a position of the one or more document object instances in the vector-based document.

6. The apparatus of claim 4, wherein the insertion module inserting one or more form fields onto the document content in the viewer further comprises the insertion module inserting one or more form fields onto a particular page in response to the particular page becoming an active page in the viewer.

7. The apparatus of claim 1, wherein the insertion module links each of the one or more form fields to a data object.

8. The apparatus of claim 1, wherein the reference module references the document content combined with the form field information.

9. The apparatus of claim 1, wherein the reference module references the document content separately from the form field information.

10. The apparatus of claim 1, further comprising a signature module for:
    providing a signature component onto the document content in the viewer, the signature component for electronically signing the vector-based document;
    processing an electronic signature from a user by way of the signature component;
    replacing the signature component on the document content with a signature token in response to processing the electronic signature.

11. The apparatus of claim 1, further comprising a finalization module for finalizing the vector-based document, the finalized vector-based document comprising one or more of user input and an electronic signature.

12. The apparatus of claim 1, further comprising:
    a document server providing the vector-based document and receiving one or more requests for the vector-based document;

a client comprising the vector-based document viewer, wherein the vector-based document viewer requests the vector-based document from the document server in response to the client loading a web page comprising embedded tags for loading the vector-based document viewer and referencing the vector-based document, the vector-based document viewer sending a request to the document server, the vector-based document viewer receiving the vector-based document from the document server.

13. The apparatus of claim 12, further comprising a web page server providing the web page comprising embedded tags for loading the vector-based document viewer.

14. The apparatus of claim 1, further comprising a conversion module for:
   receiving a base document input by a user;
   extracting form field information from the base document;
   converting the document content into at least a portion of a vector-based document; and
   saving the form field information as metadata corresponding to the document content.

15. The apparatus of claim 13, further comprising an edit module for presenting the document content and the form field information to the user in an editable display responsive to user input, wherein the apparatus further comprises a management module for modifying the form field information in response to user interaction with the editable display.

16. The apparatus of claim 1, further comprising a notification module for sending an electronic message comprising a tokenized link to a user, the tokenized link allowing the user to access the vector-based document.

17. A method for a vector-based form field document, the method comprising:
   referencing document content for a vector-based document and referencing form field information corresponding to the document content, the form field information being extracted from a base document comprising one or more form fields;
   creating one or more document object instances from the document content, the one or more document object instances associated with one or more pages of the vector-based document;
   loading the one or more document object instances in a vector-based document viewer;
   displaying the one or more pages of the vector-based document with the one or more document object instances such that a first document object instance displaying a first page is moved to a position below a second document object instance displaying a second page in response to the first page being removed from a viewable area and the second page being moved into the viewable area; and
   inserting one or more form fields onto the one or more pages in the viewer, the one or more form fields inserted based on the form field information such that an appearance of each form field approximates an appearance of a corresponding form field of the base document, each form field comprising a field for user input;
   wherein the referencing, creating, loading, displaying, and inserting are each performed using logic hardware.

18. The method of claim 17,
   wherein the first document object instance displaying the first page is moved to a position below the second document object instance displaying the second page in response to a user scrolling the first page out of the viewable area and scrolling the second page into the viewable area.

19. A computer program product for a vector-based form field document, the computer program product comprising a non-transitory computer readable storage medium storing computer usable program code executable to perform operations, the operations comprising:
   referencing document content for a vector-based document and referencing form field information corresponding to the document content, the form field information being extracted from a base document comprising one or more form fields;
   creating one or more document object instances from the document content, the one or more document object instances associated with one or more pages of the vector-based document;
   loading the one or more document object instances in a vector-based document viewer;
   displaying the one or more pages of the vector-based document with the one or more document object instances such that a first document object instance displaying a first page is moved to a position below a second document object instance displaying a second page in response to the first page being removed from a viewable area and the second page being moved into the viewable area; and
   inserting one or more form fields onto the one or more pages in the viewer, the one or more form fields inserted based on the form field information such that an appearance of each form field approximates an appearance of a corresponding form field of the base document, each form field comprising a field for user input.

20. The method of claim 17, further comprising managing a position of the one or more document object instances in the vector-based document.

* * * * *